United States Patent
Brown et al.

(10) Patent No.: US 8,223,161 B2
(45) Date of Patent: *Jul. 17, 2012

(54) ELECTRONIC ALIGNMENT OF PRIMARY COLOR PIXELS IN A SCANNED DISPLAY

(75) Inventors: Margaret K. Brown, Seattle, WA (US); Mark O. Freeman, Snohomish, WA (US); Mark Champion, Kenmore, WA (US); Shawn M. Swilley, Kent, WA (US); Maciej A. Jakuc, Everett, WA (US)

(73) Assignee: Microvision, Inc., Redmond, WA (US)

( * ) Notice: Subject to any disclaimer, the term of this patent is extended or adjusted under 35 U.S.C. 154(b) by 1195 days.

This patent is subject to a terminal disclaimer.

(21) Appl. No.: 11/843,577

(22) Filed: Aug. 22, 2007

(65) Prior Publication Data

US 2009/0051828 A1  Feb. 26, 2009

(51) Int. Cl.
*G09G 5/36* (2006.01)

(52) U.S. Cl. ........ 345/560; 345/536; 345/537; 345/545; 345/600; 345/606; 345/647; 345/672; 345/686; 348/744; 348/746; 348/807

(58) Field of Classification Search .......................... None
See application file for complete search history.

(56) References Cited

U.S. PATENT DOCUMENTS

| | | | |
|---|---|---|---|
| 4,833,528 A | 5/1989 | Kobayashi | |
| 6,038,051 A | 3/2000 | Suzuki et al. | |
| 6,404,146 B1 | 6/2002 | Leske | |
| 6,901,429 B2 * | 5/2005 | Dowling | 709/203 |
| 7,102,700 B1 * | 9/2006 | Pease et al. | 348/744 |
| 2004/0004585 A1 | 1/2004 | Brown et al. | |
| 2005/0025388 A1 | 2/2005 | Damera-Venkata et al. | |

FOREIGN PATENT DOCUMENTS

WO  WO2005067311  7/2005

* cited by examiner

*Primary Examiner* — Antonio A Caschera
(74) *Attorney, Agent, or Firm* — Kevin D. Wills

(57) ABSTRACT

An image generation apparatus provides correction for color offsets. Color offsets may be caused by misalignments in laser diodes or optics assemblies in a laser projector. The offsets may be measured during or after manufacture of the laser projector. An image buffer is responsive to the offset data to translate each color plane separately. The image buffer may include separately addressable portions for each color. Further, variable delay elements on the output of the image buffer may provide color offset correction. Interpolation provides further offset correction.

11 Claims, 10 Drawing Sheets

ELECTRONIC ALIGNMENT OF PRIMARY COLOR PIXELS IN A SCANNED DISPLAY

FIELD

The present invention relates generally to display devices, and more specifically to color alignment in display devices.

BACKGROUND

Some display devices create an image by scanning a beam of varying intensity across a display surface. For example, in projectors, a light beam is scanned across a surface in a row and column pattern. In these display devices, the beam "paints" pixels on the screen row by row by modulating the intensity of the scanned beam as it passes over (or near) each display pixel location.

Some display devices may have multiple light sources of different colors. When the multiple light sources are perfectly "aligned," each pixel is created by different colors of perfectly co-located light beams. In practice, it is difficult (and/or expensive) to perfectly align multiple light sources. As a result, the different color components of an image may be vertically and horizontally offset.

DESCRIPTION OF EMBODIMENTS

Figure 1:
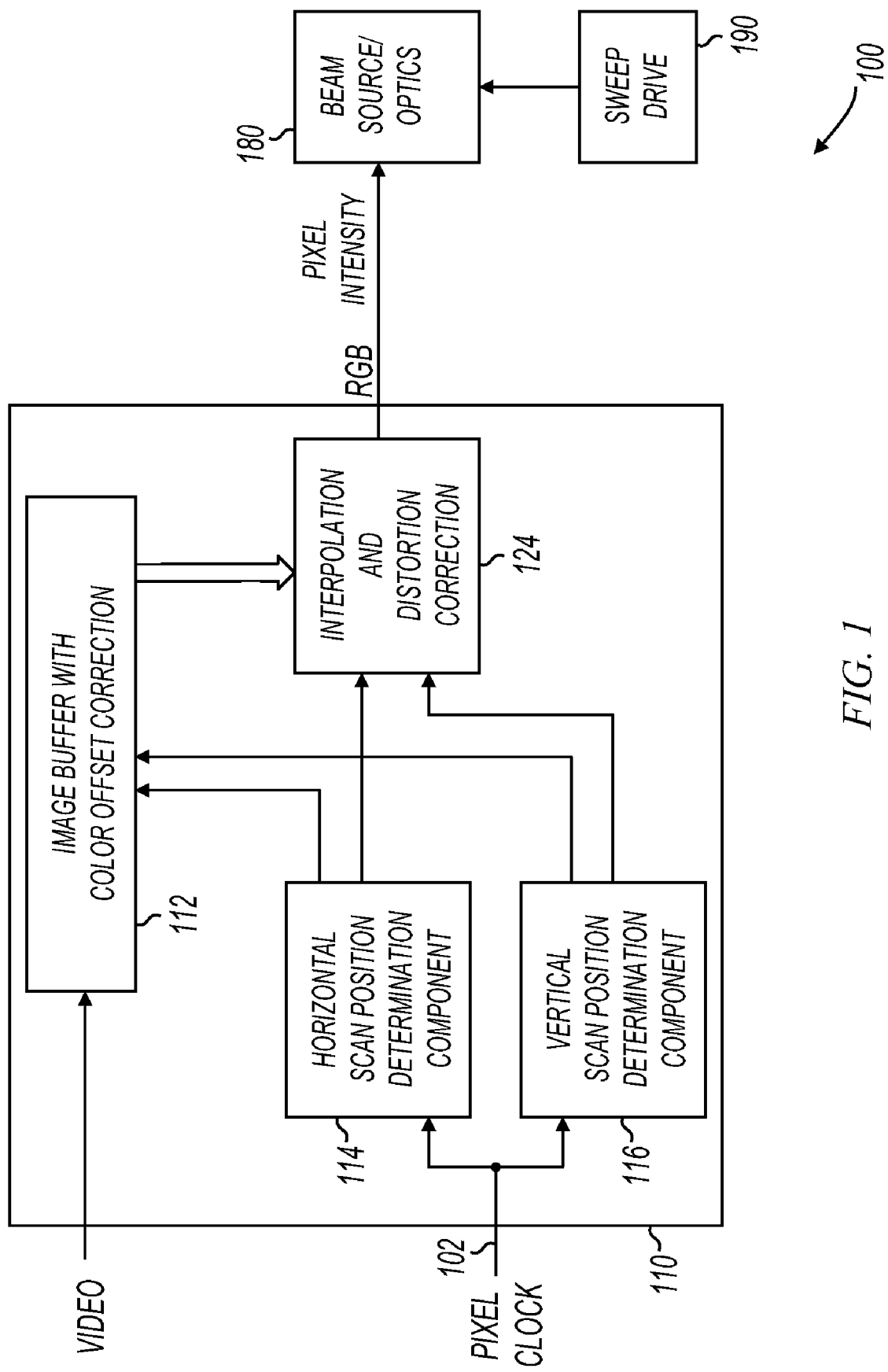
FIG. 1 shows an image generation apparatus having an image buffer with color offset correction.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows an image generation apparatus having an image buffer with color offset correction. Image generation apparatus 100 includes image processing device 110, beam source/optics 180, and sweep drive 190. Image processing device 110 includes image buffer 112, horizontal scan position determination component 114, vertical scan position determination component 116, and interpolation and distortion correction component 124.

Image buffer 112 holds rows and columns of pixel data that make up the image to be displayed. In some embodiments, image buffer 112 is periodically updated at a predetermined rate to support video display. The video data received by image buffer 112 includes digital data for three colors (e.g., red, green, blue), and image buffer 112 provides color offset correction by allowing translation of the various colors through various means.

In operation, sweep drive 190 provides signals to beam source 180 to cause a beam to scan a trajectory to paint a display image. The beam scan trajectory may take any form. For example, the scan trajectory may be linear in one direction and non-linear in another direction. Various embodiments further described below have a linear trajectory in the vertical direction and a non-linear trajectory in the horizontal direction. Other embodiments further described below have non-linear trajectories in both vertical and horizontal directions. Still further embodiments have linear trajectories in both vertical and horizontal directions.

Image processing device 110 receives a pixel clock on node 102. The pixel clock is provided to horizontal scan position determination component 114 and vertical scan position determination component 116. In some embodiments, the pixel clock is a periodic clock that provides edges at periodic intervals having a constant period. In other embodiments, the pixel clock is non-linear. Depending on the type of scan trajectory (linear vs. non-linear), and the type of pixel clock (linear vs. non-linear), the scan beam may or may not be at a position in the display image that corresponds to a pixel.

Each time a pixel clock edge arrives, horizontal scan position determination component 114 determines (or provides) the current horizontal position of the beam within the displayed image. Similarly, each time a pixel clock edge arrives, vertical scan position determination component 116 determines (or provides) the current vertical position of the beam within the displayed image. The current vertical and horizontal scan positions are provided to image buffer 112 and interpolation and distortion correction component 124. Image buffer 112 provides pixel data to component 124 which then interpolates between pixel data and corrects for distortion.

In some embodiments, approximations are made as to one or both of the horizontal and vertical scan positions. For example, in some embodiments, the vertical scan position may be approximated as a constant row, even though this may not be 100% accurate. Also for example, in some embodiments, the vertical scan position may be approximated as a closest row, even though this may not be 100% accurate. In some embodiments, mathematical functions are evaluated at each pixel clock to determine the horizontal and vertical scan positions. For example, ramp functions or trigonometric functions may be evaluated. In some embodiments, a sum of sine functions is evaluated to approximate a triangular wave. These and other approximations are described below with reference to later figures.

Interpolation and distortion correction component 124 provides pixel intensity data to beam source/optics component 180. In some embodiments, this data is converted to a current to drive a light source. A higher pixel intensity value results in a higher current, which in turn results in a brighter displayed pixel.

Beam source/optics component 180 may not produce perfectly aligned color light beams. For example, color offsets due to manufacturing tolerances may result in an image that has red, green, and blue components offset from each other on the screen.

Image buffer 112, in various embodiments of the present invention, includes an offset mechanism to counter the effects of the non-alignment of beam source/optics component 180. For example, in some embodiments, image buffer 112 receives 24 bit color data (eight bits each for red, green, and blue) and separates it into three different 8 bit color buffers. The color buffers may be separately addressable. In some embodiments, the separately addressable buffers have the different colors translated in two dimensions, so as to provide color alignment within one half of a pixel width. Various embodiments of image buffers with color offset correction are described more fully with reference to later figures.

The various components shown in FIG. 1 may be implemented in many ways. For example, components 114 and 116 may be implemented in dedicated hardware, software or any combination. When operating at slower speeds, software implementations may be fast enough to satisfy display rate requirements. When operating at high speeds, a dedicated hardware implementation may be fast enough to satisfy display rate requirements.

In some embodiments, video data may be stored and transferred as gamma-corrected data. Gamma correction is a non-linear encoding function that reduces the number of bits needed to represent intensity. Before performing the interpolation function, the data is transformed back to linear codes using a gamma function such as $y=x^{2.2}$. This function may be applied after the pixel data is pulled out of the frame buffer but before any interpolation.

In some embodiments, additional transformation functions may exist in the video path. For example, color-space conversion may be included in the video path. In the case of color-space conversion, the transformation occurs after the gamma function but before the color channels are offset. Many more combinations of transformation functions may be included in the video path without departing from the scope of the present invention.

Figure 2:
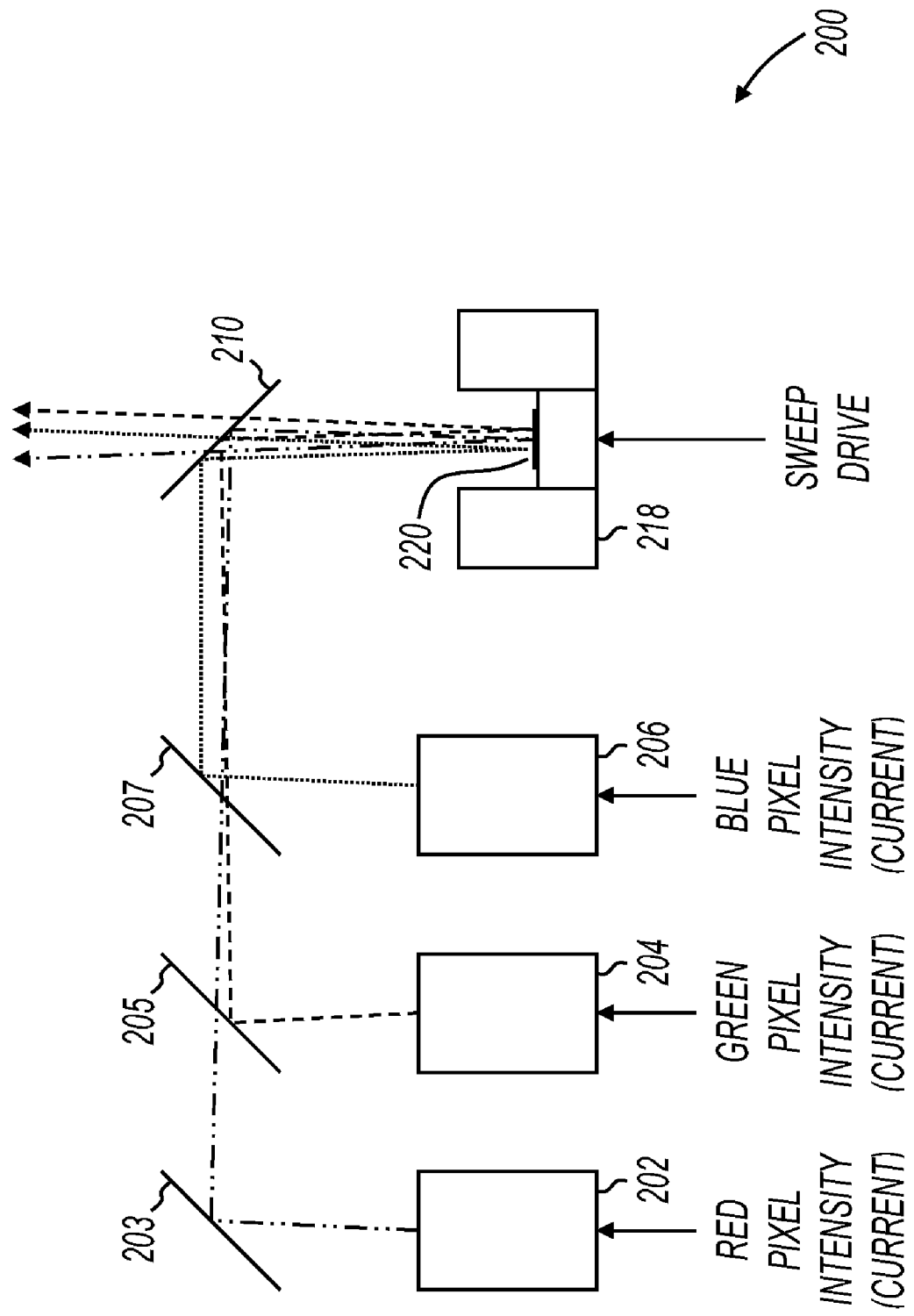
FIG. 2 shows a micro-projector.

FIG. 2 shows a micro-projector suitable for use in the disclosed image generation apparatus embodiments. Projector 200 may be used in apparatus 100 (FIG. 1) as beam source/optics component 180, although this is not a limitation of the present invention.

Projector 200 includes laser diodes 202, 204, and 206. Projector 200 also includes mirrors 203, 205, and 207, filter/polarizer 210, and Micro-Electrical-Mechanical System (MEMS) device 218 having mirror 220. The laser diodes are driven by red, green, and blue intensity data (current) as described above with reference to FIG. 1. Red, green, and blue light is provided by the laser diodes, although other light sources, such as color filters or light emitting diodes (LEDs) or edge-emitting LEDs, could easily be substituted. One advantage of lasers is that their light is produced as a column, and this column emerges as a narrow beam. When each beam is directed at the MEMS mirror (either directly or through guiding optics) the colors of light can be mixed on the surface of the mirror, pixel by pixel.

In some embodiments, the MEMS mirror is a biaxial mirror that rotates on two axes to sweep the light beams in both horizontal and vertical directions. In other embodiments, the MEMS mirror includes two separate mirrors, each scanning on one axis. The trajectory that the beam takes is a function of the signals received from the sweep drive. In some embodiments, the beam may sweep back and forth horizontally in a sinusoidal pattern. Further, in some embodiments, the beam may sweep up and down vertically in a sinusoidal pattern. In general, the beam may be swept in any combination of horizontal and vertical patterns, including linear and non-linear patterns. Pixels may be displayed when the beam is sweeping in one direction or in both directions. For example, in some embodiments, pixels may be displayed as the beam sweeps down in the vertical direction, but not when the beam sweeps back up. Also for example, in some embodiments, pixels may be displayed as the beam sweeps down as well as when the beam sweeps up in the vertical direction.

In other embodiments, the mirror may be any mirror or display that scans light beams. This may include using two uni-axial scanning mirrors made with another technology besides MEMS, for example and without limitation, a galvo mirror or magnetic resonant scanning mirror, and the like. Any combination of uni-axial and/or biaxial scanning mirrors made by any process are within the scope of the invention.

This process of picture-building can be repeated many times per second, to reproduce moving pictures. Therefore, a MEMS mirror and three colored light sources can function like a traditional CRT monitor or television set, but without the metal and glass vacuum tube, and without the phosphors on a screen. Instead, this produces a small projector, with a nearly infinite focal point.

As shown in FIG. 2, various types of misalignment may be present. Light sources such as laser diodes 202, 204, and 206 may be misaligned, and/or mirrors 203, 205, and 207 may be misaligned. These misalignments may cause the resulting image to have color offsets. The misalignments and offsets may vary for each laser projector produced. In some embodiments, the color offsets are measured during or after manufacture, and an image buffer (e.g., 112, FIG. 1) is provided with the offset information to allow for compensation.

The MEMS based projector is described as an example, and the various embodiments of the invention are not so limited. For example, other projector types having color offsets may be included in image generation systems without departing from the scope of the present invention.

Figure 3:
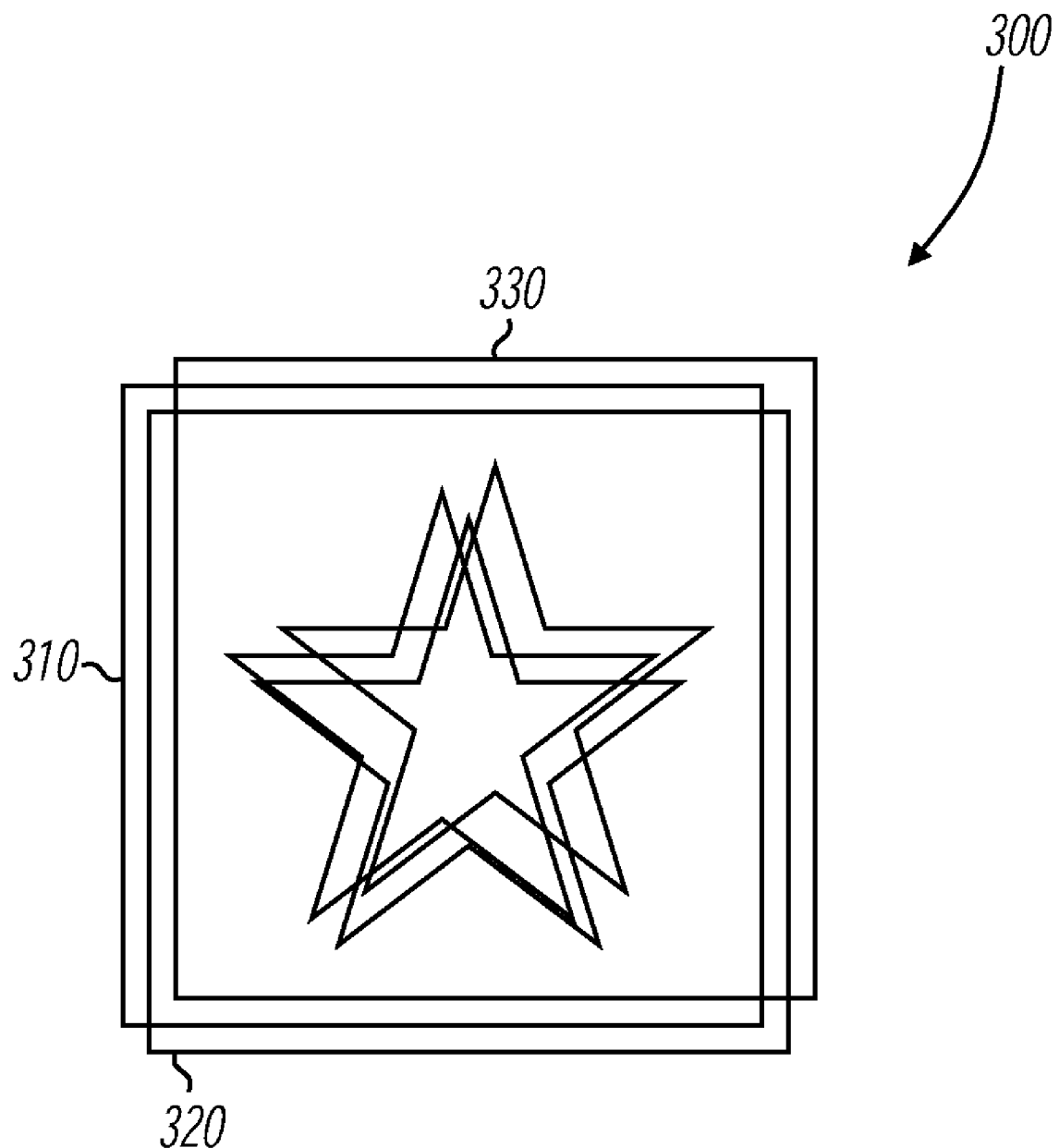
FIG. 3 shows a projected image with color offsets.

FIG. 3 shows a projected image with color offsets. Image 300 includes color components 310, 320, and 330. Color component 310 may correspond to a red image, color component 320 may correspond to a green image, and color component 330 may correspond to a blue image. The three color images are shown offset in an exaggerated manner to illustrate the effects of a misaligned optical system.

Various embodiments of the present invention correct for the color offsets by translating at least two of the color images to match the third. For example, color component 320 may be translated up and to the left to match color component 310, and color component 330 may be translated down and to the left to match color component 310.

Figure 4:
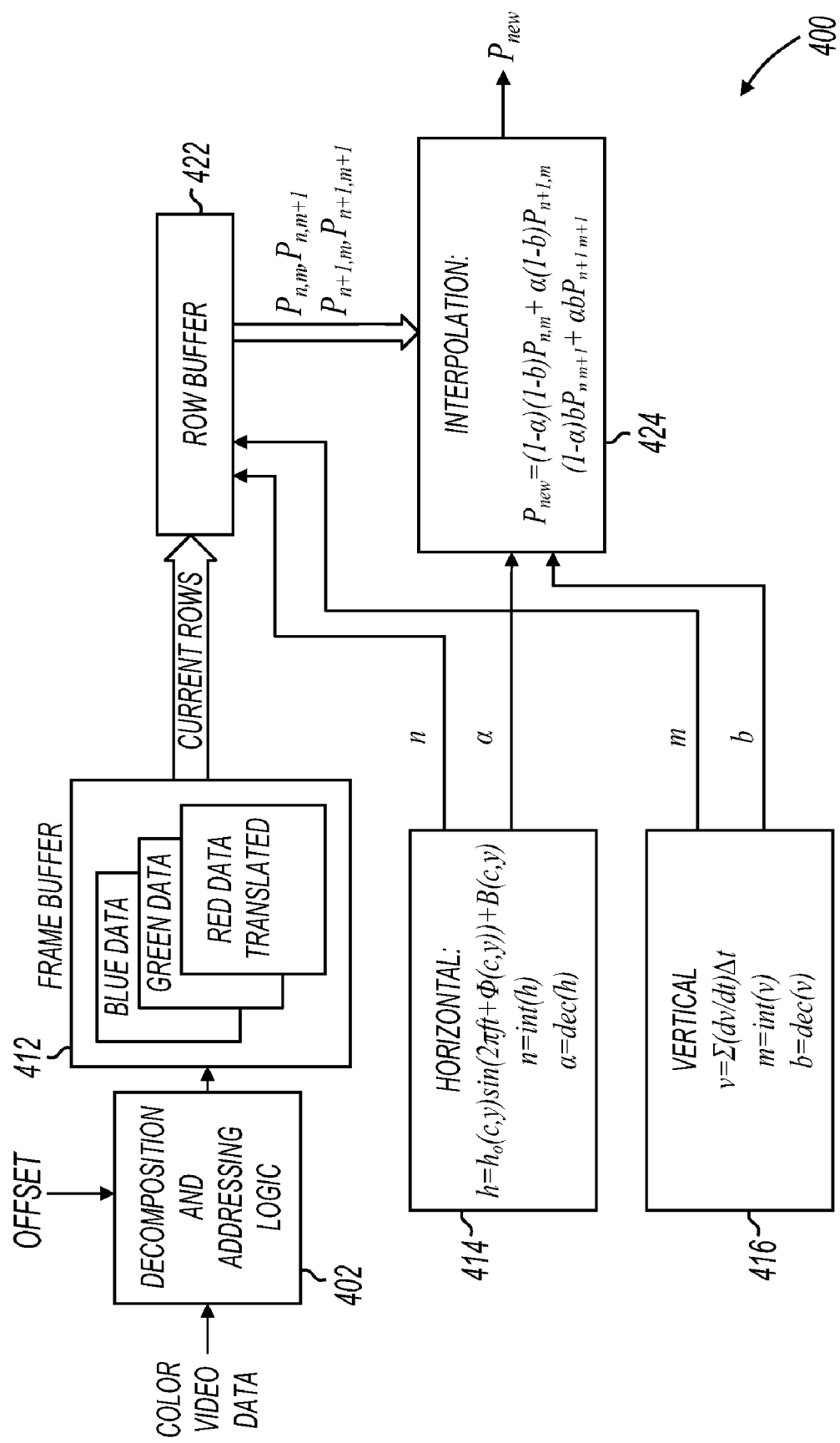
FIG. 4 shows an image processing device with color data offset in a frame buffer.

FIG. 4 shows an image processing device with color data offset in a frame buffer. Image processing device 400 includes decomposition and addressing logic 402, frame buffer 412, row buffer 422, horizontal scan position determination component 414, vertical scan position determination component 416, and interpolation and distortion correction component 424.

In operation, color video data and offset data is received by decomposition and addressing logic 402. The offset data describes the amount and type of offset to apply to each color. For example, red may be shifted up one pixel and right three pixels, and blue may be shifted up two pixels and left one pixel. The offset data may be generated during a calibration procedure, and may be held in a register or other nonvolatile storage. In general, the offset data remains static, but in some embodiments, it may be periodically updated.

Decomposition and addressing logic 402 separates the video data into three constituent colors. For example, the video data may include 24 bit color data, and decomposition and addressing logic 402 may separate the 24 bit color data into three separate streams of eight bit color data to represent red, green, and blue. Decomposition and addressing logic 402 operates as a color plane translation component in that each of the red, green, and blue data are translated and recombined in response to the offset data, and the results are written to frame buffer 412.

Frame buffer 412 is shown having translated color data. Each of the colors can be translated both horizontally and vertically by an integer number of pixels, thereby allowing color offset correction to within one half pixel width. Further color offset correction (smaller fractional pixel widths) can then be provided by interpolation and distortion correction component 424 as further described below.

In some embodiments, frame buffer 412 may be larger than the displayed image. For example, in some embodiments, the displayed image may be 800×600, and frame buffer 412 may be larger than 800×600×24 bits.

Vertical scan position determination component 416 determines the vertical scan position v as $$v = \sum \frac{dv}{dt} \Delta t. \quad (1)$$

The vertical scan position v is broken down into the integer portion m and the decimal portion b. For example, if v is determined to be 9.7, (between the ninth and tenth pixel), then m=9 and b=0.7.

In some embodiments, vertical scan position determination component 416 provides the current vertical scan position as the current row. For example, the vertical sweep rate may be set such that each horizontal sweep corresponds to one row of pixels. In these embodiments, component 416 simply increments v each time the horizontal sweep reaches either the left or right side of the image. Row buffer 422 loads the current row from frame buffer 112 each time the vertical scan position v increments. In embodiments having a vertical retrace, v is incremented from zero to the total number of rows, and then restarts back at zero for the next vertical sweep from top to bottom. In embodiments having a bidirectional vertical sweep, v counts up in one vertical direction and counts down in the opposite vertical direction.

In some embodiments, row buffer 422 is loaded with two current rows for each horizontal sweep. Vertical interpolation is provided between pixels in the two rows (m, m+1) for the entire horizontal sweep. In other embodiments, the vertical sweep rate is independent of, and not related to, the number of rows in the image.

Horizontal scan position determination component 414 determines the current horizontal scan position at each pixel clock as $$h = h_o(c,y)\sin(2\pi ft + \Phi(c,y)) + B(c,y). \quad (2)$$

As shown in equation (2), the horizontal scan position h is determined as the sum of an offset B and a scaled sine of a linearly increasing angle. The linearly increasing angle is created because t advances the same amount for each pixel clock. In some embodiments, the phase offset θ is not a constant. For example, in some embodiments, the phase offset is a function of one or both of the color being processed c, and the current vertical scan position y. The sine function is scaled by multiplier $h_o$. In some embodiments, the multiplier and or the offset are a function of one or both of the color being processed c, and the current vertical position y. Multiplier $h_o$ provides normalization so that h has a value in pixels between the left and right edges of the image. For example, for an 800×600 display with 800 pixels in each row, h may have a range of 800. In some embodiments, the range may be greater than 800 to accommodate overscan regions beyond the displayed image. The horizontal scan position h is broken down into the integer portion n and the decimal portion a. For example, if h is determined to be 6.4, (between the sixth and seventh pixel), then n=6 and a=0.4.

Although the horizontal scan position determination is shown as a sine function and the vertical scan position determination is shown as a linear increasing function, this is not a limitation of the present invention. For example, both horizontal and vertical scan trajectories may be linear, or may be sinusoidal. Also for example, one or both of the horizontal and vertical scan trajectories may be represented by a sum of sine functions. For example, a triangular trajectory may be approximated by summing the first three sine functions in a Taylor series expansion of a triangular wave. Both horizontal and vertical trajectories may be implemented in this manner. In some embodiments, one or both of horizontal and vertical scan determination components 414 and 416 are implemented as look up tables to support arbitrary scan trajectories.

Row buffer 422 receives n and m and provides pixel intensity data for pixels $P_{n,m}$, $P_{n,m+1}$, $P_{n+1,m}$, and $P_{n+1,m+1}$ to interpolation and distortion correction component 424. Interpolation and distortion correction component 424 interpolates between $P_{n,m}$, $P_{n,m+1}$, $P_{n+1,m}$, and $P_{n+1,m+1}$ to determine the new pixel intensity $P_{new}$ as $$P_{new} = (1-a)(1-b)P_{n,m} + a(1-b)P_{n+1,m} + (1-a)bP_{n,m+1} + abP_{n+1,m+1} \quad (3)$$

Equation (3) is an example of linear interpolation between four pixels. The various embodiments of the invention are not limited to linear interpolation. For example, in some embodiments, nearest neighbor interpolation is used, and in other embodiments, higher order (e.g., cubic) interpolation is utilized.

Equation (3) provides interpolation between pixels in different rows and different columns. In operation, row buffer 422 holds as many rows as necessary to accommodate one horizontal sweep. Prior to each horizontal sweep, row buffer 422 is loaded with multiple rows of pixel data from frame buffer 412. Power is saved because random access within frame buffer 412 is not required.

The scaling and offset in equation (2) can provide further color offset correction in the horizontal dimension. The offset B and the multiplier $h_o$ provide normalization as described above, and also provide horizontal color offset correction by modifying the current horizontal scan position. For example, the image may be stretched or contracted in the horizontal direction as a function of color and/or vertical scan position based on $h_o$. In some embodiments, the vertical scan position y is the same as v, and in other embodiments, y is determined using a separate function. The amount of horizontal offset B may also be a function of color and/or vertical scan position. By modifying $h_o$ and B, varying amounts of additional color offset correction can be provided.

In some embodiments, $h_o$ and B correct for distortion in the beam generation electronics and optics. For example, nonlinearities in the various circuits shown in FIG. 2 may be corrected by modifying $h_o$ and B. As described above $h_o$ and B can also be a function of color (e.g., red, green, blue). Each of the separate colors can be separately corrected so that the red, green, and blue images coincide on the screen.

In some embodiments, vertical scan position determination component 416 also includes a function with scaling and offsets (similar to $h_o$ and B). In these embodiments, additional vertical color offset correction can be implemented through scaling and offsets as a function of color. In contrast to horizontal scaling and offsets, increased vertical scaling and offsets increase the size of row buffer 422, resulting in a trade-off between vertical color offset correction and power consumption due to the size of row buffer 422. In some embodiments, the size of row buffer 422 is large enough to accommodate the largest number of rows traversed by a horizontal sweep of the scan trajectory. For example, a horizontal sweep may traverse two rows, in which case row buffer 422 has at least two rows. Also for example, a horizontal sweep may traverse five rows, in which case row buffer 422 has at least five rows. The number of rows traversed in a horizontal sweep and the minimum number of rows in the row buffer are a function of the trajectory, and the various embodiments of the invention are not limited thereby. Any trajectory may be used, and any number of rows may be traversed in a single horizontal sweep.

Both the horizontal scan position function and the vertical scan position function may include variable phase values that are a function of color and/or vertical position. This may be utilized to correct for delays in laser driver electronics or other circuits. In general, phase values may vary based on any criteria, and variable phase functions may be included in any of the disclosed embodiments without departing from the scope of the present invention.

Figure 5:
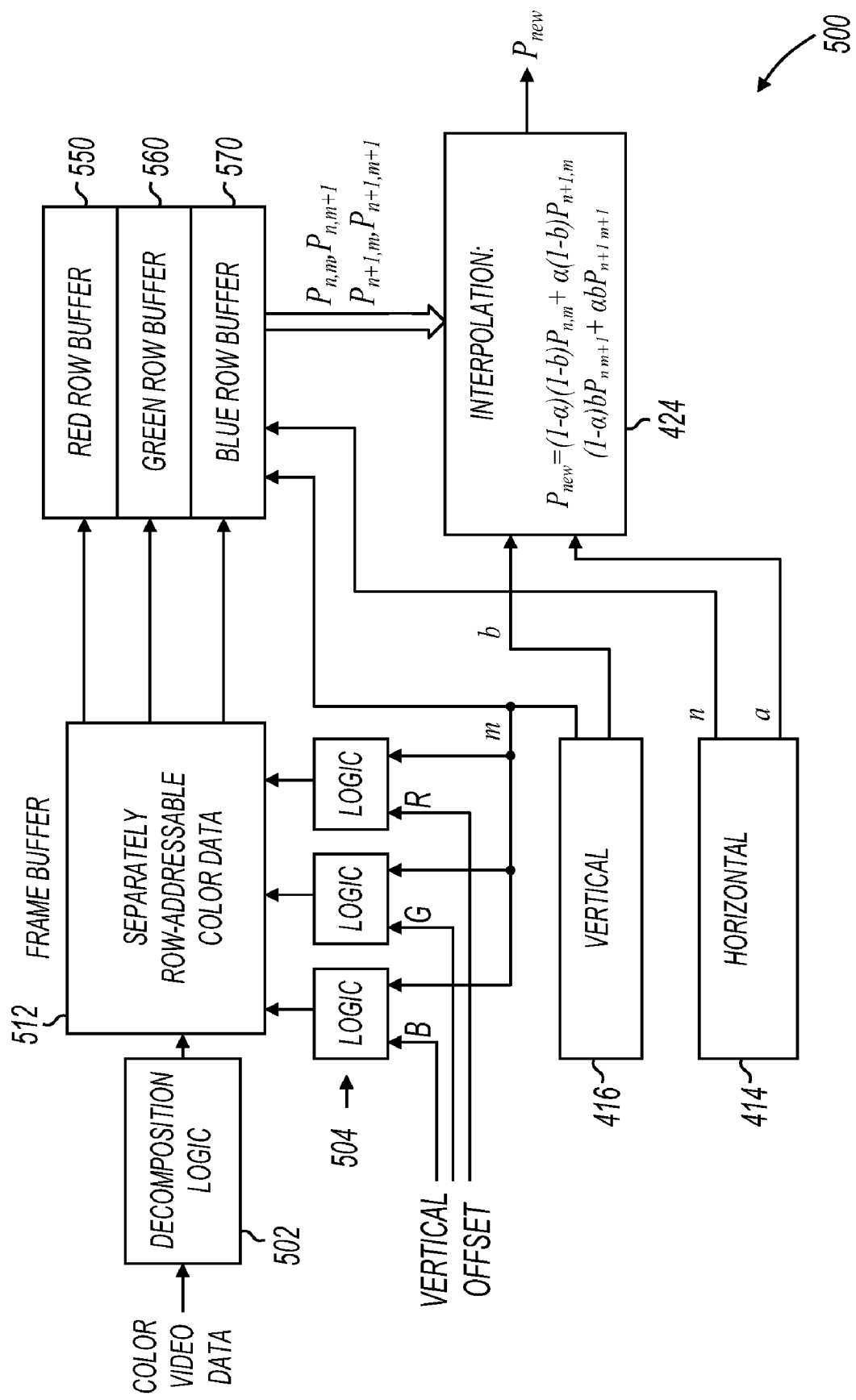
FIG. 5 shows an image processing device with a frame buffer having separately row-addressable color data.

FIG. 5 shows an image processing device with a frame buffer having separately row-addressable color data. Image processing device 500 includes decomposition logic 502, frame buffer 512, row buffers 550, 560, and 570, frame buffer addressing logic 504, vertical scan position determination component 416, horizontal scan position determination component 414, and interpolation component 424. Components 414, 416, and 424 are described above with reference to FIG. 4.

In operation, decomposition logic 502 receives video data and loads frame buffer 512. The video data is decomposed into its constituent colors, and loaded into separately row-addressable portions of frame buffer 512. For example, the video data may include 24 bit color data, and decomposition logic 502 may break it into three eight bit color streams that are written into separately addressable portions of frame buffer 512.

Vertical scan position determination component 416 determines the current vertical scan position as v, where m is the integer portion of v, and b is the fractional portion of v. m is provided to addressing logic 504, which then provides separate row addresses for each of the different colors (red, green, and blue). The separate row addresses are generated from a combination of m and vertical offset values for each color. In response to the row-addressing of frame buffer 512, row buffers 550, 560, and 570 are loaded with rows that coincide in the image within one half pixel width. Accordingly, the vertical color offset is partially corrected by addressing different rows in frame buffer 512 as a function of color.

Row buffers 550, 560, and 570 each receive one or more rows of corresponding color pixel data. The row buffers also receive n, m, b, and a from the scan position determination components 414 and 416. In some embodiments, n, m, b, and a are different for each color. For example, different values for h and v may be determined for each color, and therefore different values of n, m, b, and a may also be determined for each color. The various row buffers respond to the corresponding n, m, b, and a values, and interpolation component 424 separately operates on pixel data from the three different row buffers. Accordingly, $P_{new}$ includes pixel intensity data for all three colors, each arrived at separately.

As shown in FIG. 5, the addressing scheme of frame buffer 512 provides integer color offset in the vertical direction. Fractional color offset in the vertical direction is provided by the combination of scan position determination component 416 and interpolation component 424. Both integer and fractional color offset in the horizontal direction are provided by the combination of horizontal scan determination component 414 and interpolation component 424.

As discussed above with reference to earlier figures, the row buffers may include any number of rows. In some embodiments only two rows per color are used at a time, and a single horizontal sweep always interpolates between the same two rows. In other embodiments, a single horizontal sweep may traverse more than two rows of pixels, and each of the row buffers 550, 560, and 570 include more than two rows of data.

Figure 6:
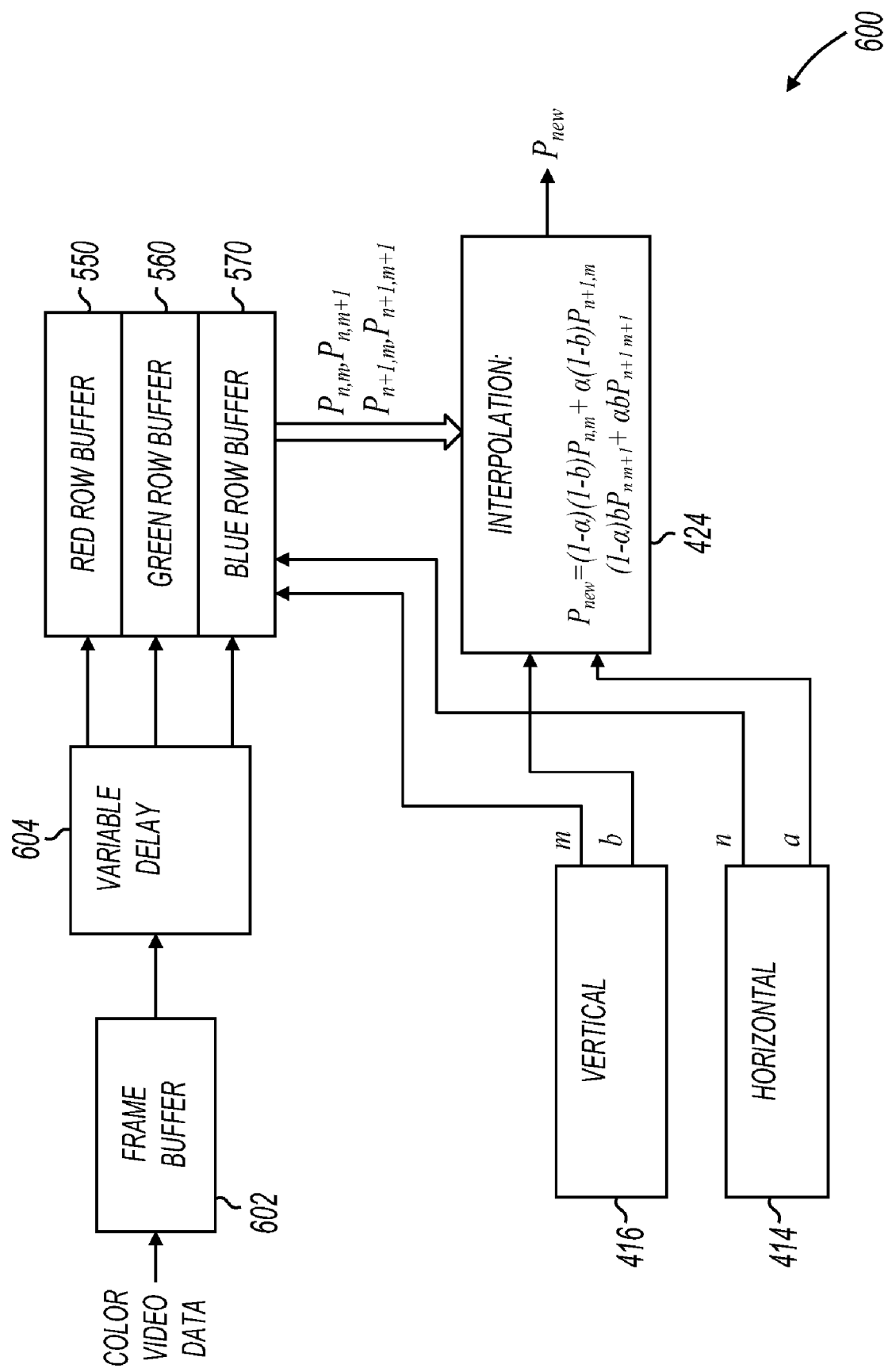
FIG. 6 shows an image processing device with a variable delay element following a frame buffer.

FIG. 6 shows an image processing device with a variable delay element following a frame buffer. Image processing device 600 includes frame buffer 602, variable delay element 604, row buffers 550, 560, and 570, vertical scan position determination component 416, horizontal scan position determination component 414, and interpolation component 424. Row buffers 550, 560, and 570, vertical scan position determination component 416, horizontal scan position determination component 414, and interpolation component 424 are described above with reference to previous figures.

In operation, video data is received into frame buffer 602. Rows of pixel data are read out from frame buffer 602 to variable delay element 604. In some embodiments, variable delay element 604 delays one or more of the color data streams by an integer number of rows. For example, if a row is 800 pixels wide, variable delay element 604 may delay one color by 800r, where r is any integer. By delaying colors an integer number of rows, vertical color offset may be compensated.

As shown in FIG. 6, the amount of delay provided by variable delay element 604 provides integer color offset in the vertical direction. Fractional color offset in the vertical direction is provided by the combination of scan position determination component 416 and interpolation component 424. Both integer and fractional color offset in the horizontal direction are provided by the combination of horizontal scan determination component 414 and interpolation component 424.

Figure 7:
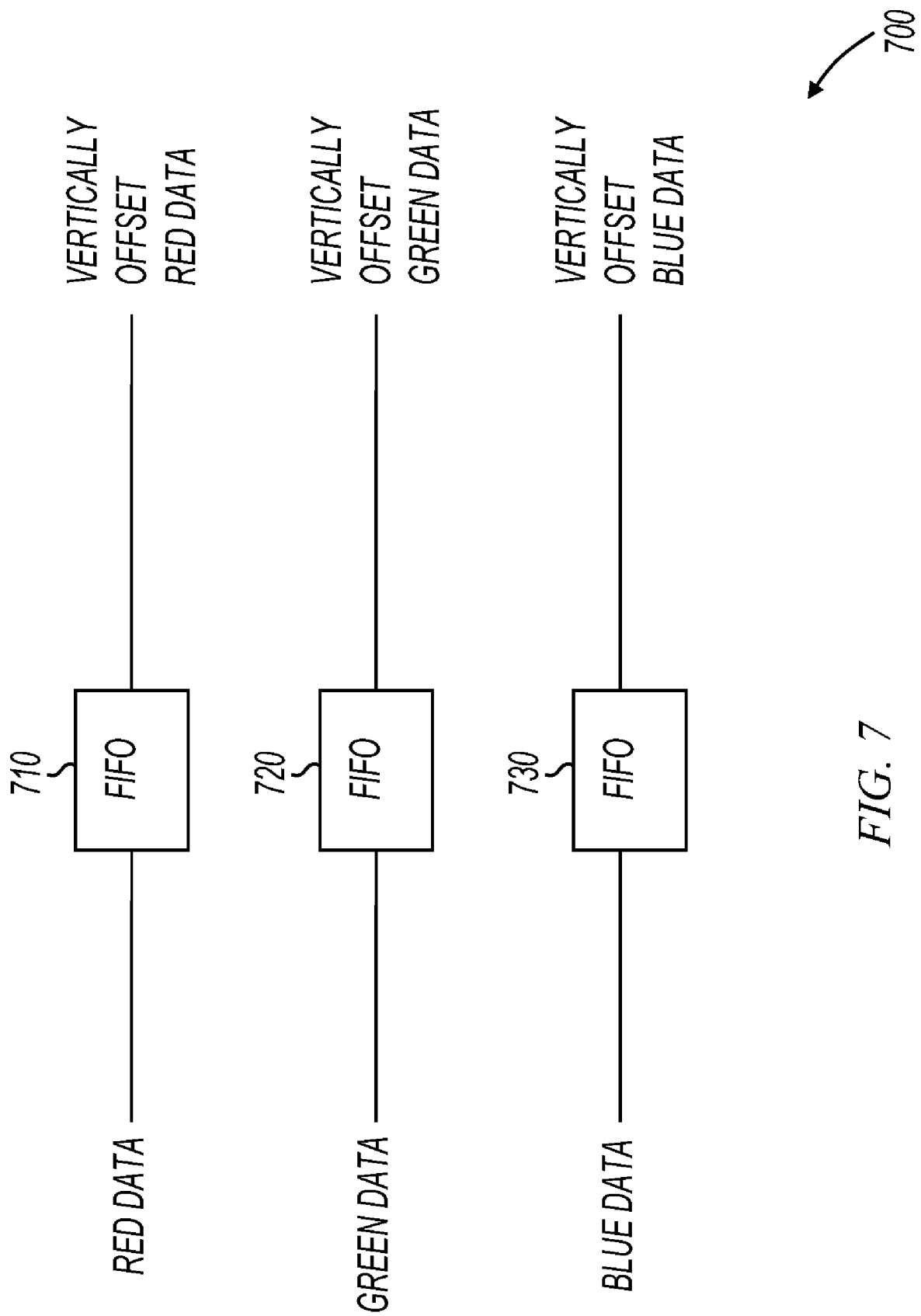
FIGS. 7 and 8 show variable delay elements.

FIG. 7 shows a variable delay element. Variable delay element 700 includes first-in-first-out (FIFO) memories 710, 720, and 730. Variable delay element 700 may be used as variable delay element 604 (FIG. 6).

In this structure, all FIFOs are large enough to handle vertical offsetting of the largest expected vertical offset. For example, in some embodiments, each FIFO may be large enough to delay each color by as much as 8 pixels vertically (8 rows). At design time, it is not known which color channel will require delay, so all channels are provided with the ability to delay up to the maximum (eight rows in this example). The depth of each FIFO is set after an alignment procedure that determines the amount of offset needed in each color.

Figure 8:
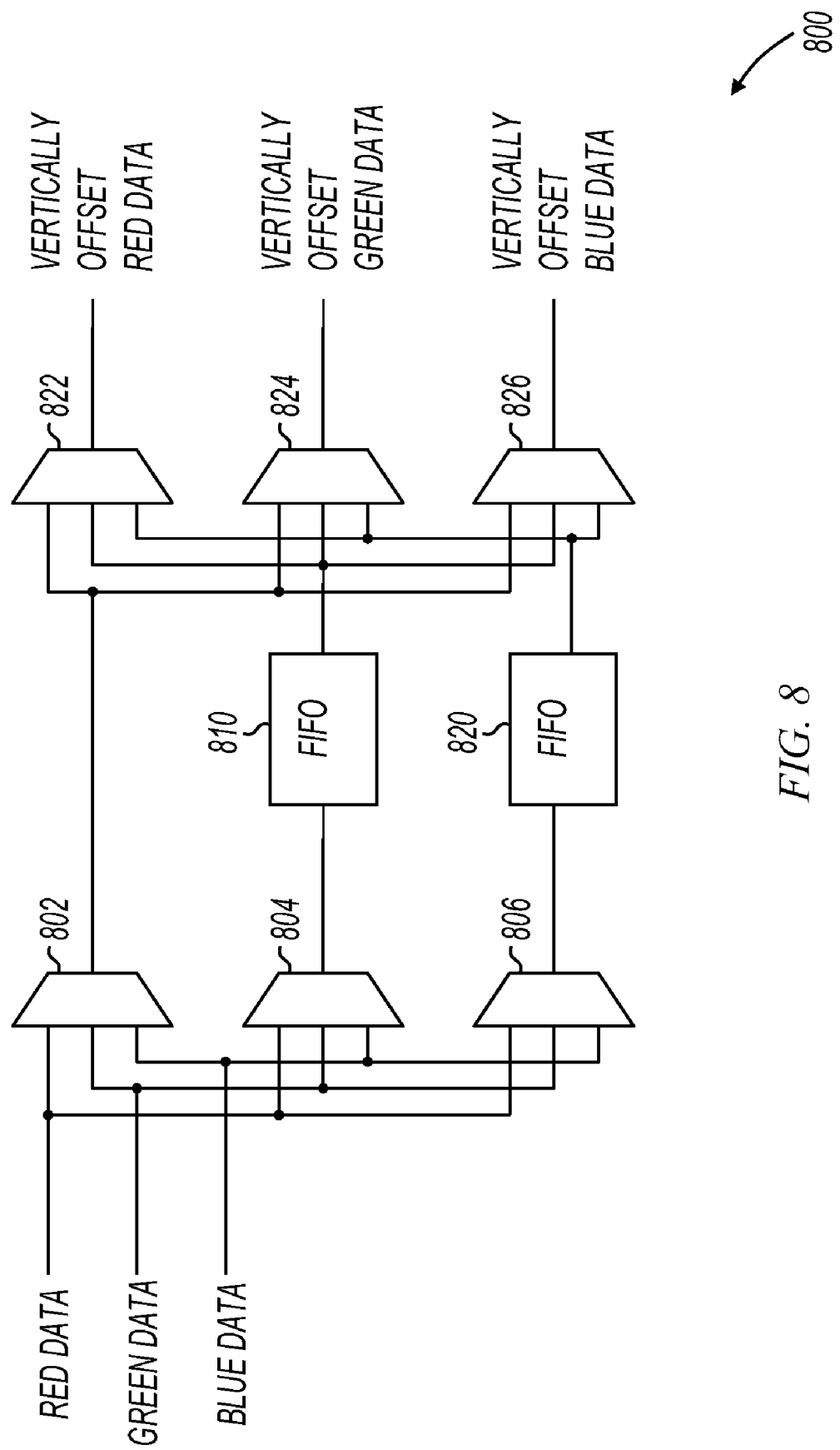

FIG. 8 shows a variable delay element. Variable delay element 800 may be used as variable delay element 604 (FIG. 6). Variable delay element 800 includes multiplexers 802, 804, 806, 822, 824, and 826, and first-in-first-out (FIFO)

memories 810 and 820. Multiplexers 802, 804, and 806 receive the red, green, and blue data from the frame buffer, and steer it to one of FIFOs 810 and 820, or to a straight through path.

FIFOs 810 and 820 can provide a variable amount of delay relative to the straight through path. For example, the red data may be selected for the straight through path, the blue data may be selected to pass through FIFO 810 with a two row delay, and the green data may be selected to pass through FIFO 820 with a four row delay.

The operation of the various elements in FIG. 8 may be influenced by the vertical offset data (not shown). For example, the multiplexers may be steered based on which colors are to be delayed relative to the others, and the depth (delay) of the FIFOs may be set to accomplish an integer number of row delays.

The structure in FIG. 8 reduces the amount of hardware as compared to the structure in FIG. 7. This hardware reduction takes advantage of the realization that one channel will not require any delay. Furthermore, it realizes that one of the channels will require some maximum delay. The maximum delay (e.g., eight rows) may be implemented with FIFO 820. A smaller delay (e.g., four rows) may be implemented with FIFO 810. During alignment, the programmable multiplexer structure allows the three color channels to be routed through the appropriate FIFOs to provide the largest delay to the color channel that requires the largest vertical offset. In this way, the total FIFO memory may be significantly reduced.

Figure 9:
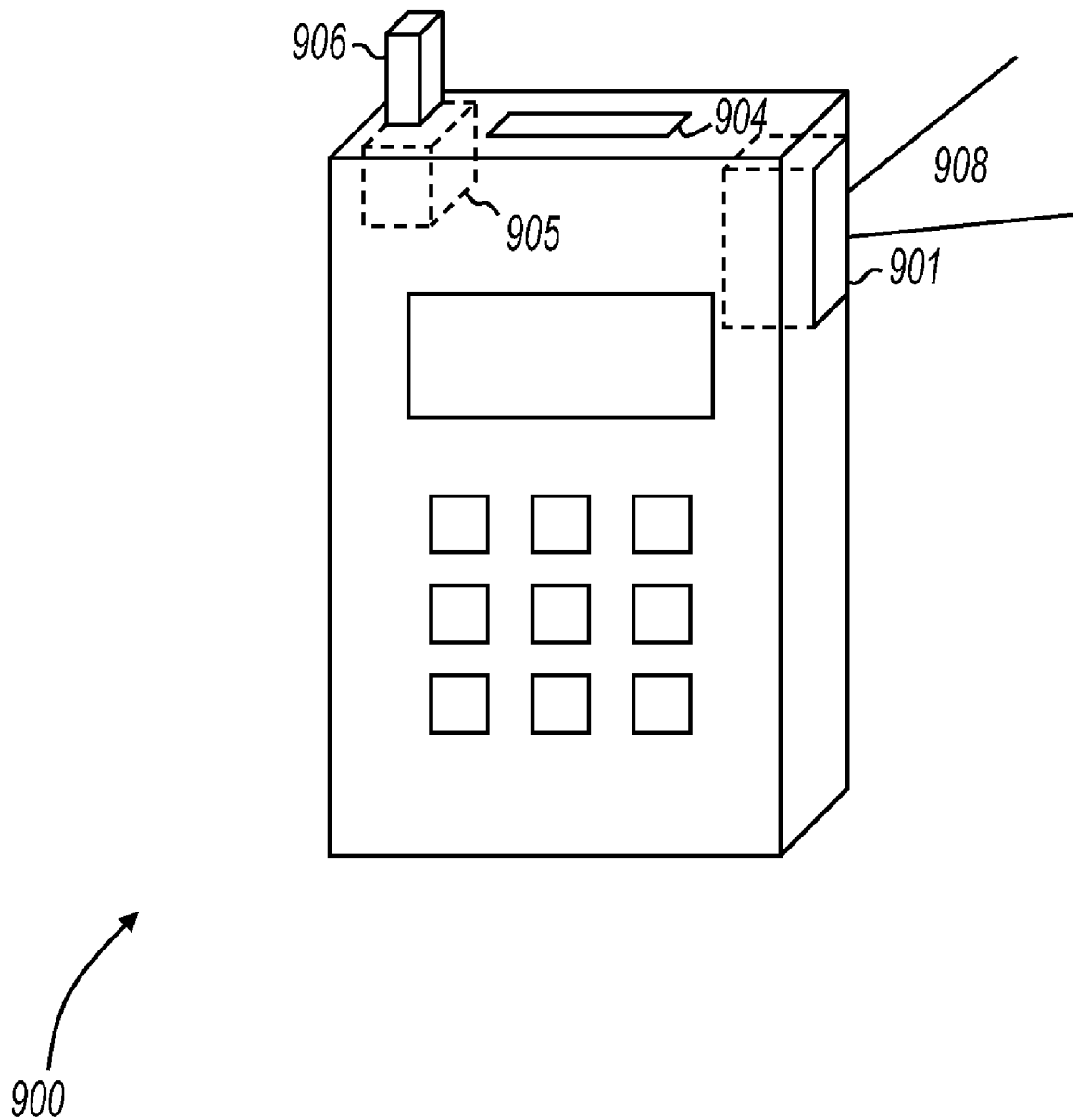
FIG. 9 shows a mobile device in accordance with various embodiments of the present invention.

FIG. 9 shows a mobile device in accordance with various embodiments of the present invention. Mobile device 900 may be a hand held projection device with or without communications ability. For example, in some embodiments, mobile device 900 may be a handheld projector with little or no other capabilities. Also for example, in some embodiments, mobile device 900 may be a device usable for communications, including for example, a cellular phone, a smart phone, a personal digital assistant (PDA), a global positioning system (GPS) receiver, or the like. Further, mobile device 900 may be connected to a larger network via a wireless (e.g., WiMax) or cellular connection, or this device can accept data messages or video content via an unregulated spectrum (e.g., WiFi) connection.

Mobile device 900 includes laser projector 901 to create an image with light 908. Similar to other embodiments of projection systems described above, mobile device 900 may include a projector with an image buffer that provides color offset correction to correct for misaligned optics.

In some embodiments, mobile device 900 includes antenna 906 and electronic component 905. In some embodiments, electronic component 905 includes a receiver, and in other embodiments, electronic component 905 includes a transceiver. For example, in GPS embodiments, electronic component 905 may be a GPS receiver. In these embodiments, the image displayed by laser projector 901 may be related to the position of the mobile device. Also for example, electronic component 905 may be a transceiver suitable for two-way communications. In these embodiments, mobile device 900 may be a cellular telephone, a two-way radio, a network interface card (NIC), or the like.

Mobile device 900 also includes memory card slot 904. In some embodiments, a memory card inserted in memory card slot 904 may provide a source for video data to be displayed by laser projector 901. Memory card slot 904 may receive any type of solid state memory device, including for example, Multimedia Memory Cards (MMCs), Memory Stick DUOs, secure digital (SD) memory cards, and Smart Media cards. The foregoing list is meant to be exemplary, and not exhaustive.

Figure 10:
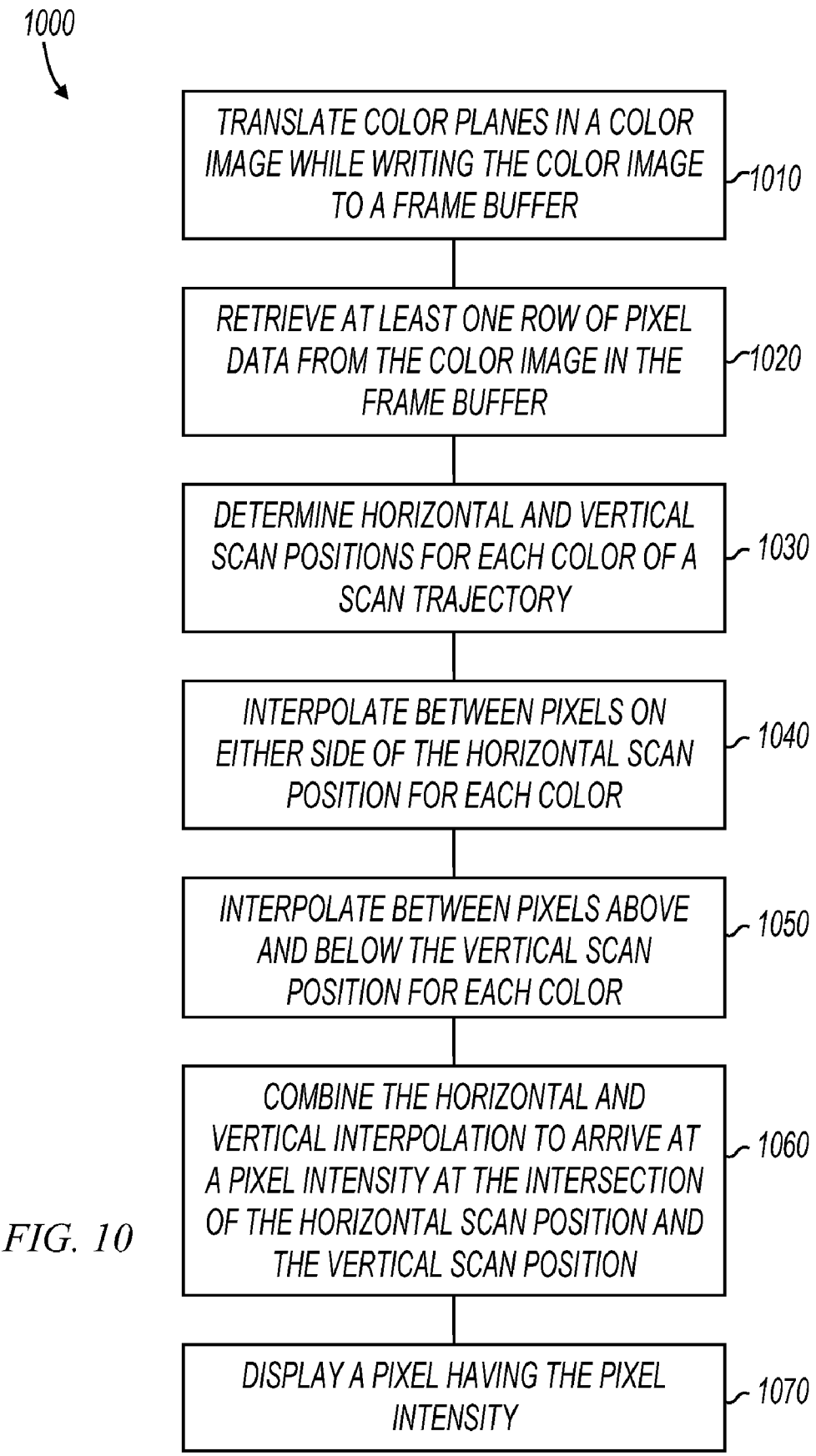
FIG. 10 shows a flowchart in accordance with various embodiments of the present invention.

FIG. 10 shows a flowchart in accordance with various embodiments of the present invention. In some embodiments, method 1000, or portions thereof, is performed by an image generation apparatus, a mobile projector, or the like, embodiments of which are shown in previous figures. In other embodiments, method 1000 is performed by an integrated circuit or an electronic system. Method 1000 is not limited by the particular type of apparatus performing the method. The various actions in method 1000 may be performed in the order presented, or may be performed in a different order. Further, in some embodiments, some actions listed in FIG. 10 are omitted from method 1000.

Method 1000 is shown beginning with block 1010 in which color planes are translated in a color image while writing the color image to a frame buffer. The result is a frame buffer having the configuration of frame buffer 412 (FIG. 4) where each color plane is translated both vertically and horizontally to compensate for misalignment in laser diodes and optics. As a result of the translation in the frame buffer, each of the color planes are aligned to within one half of one pixel width.

At 1020, at least one row of pixel data is retrieved from the color image in the frame buffer. In some embodiments, two rows of pixel data are retrieved, and for a single horizontal sweep, vertical interpolation is performed between pixels in these two rows. In other embodiments, a single horizontal sweep traverses more than two rows, and more than two rows of pixel data are retrieved from the frame buffer.

At 1030, horizontal and vertical scan positions for each color of a scan trajectory are determined. In some embodiments, the scan positions for each color are a function of an offset that is less than half of a pixel width. By utilizing offsets in this manner, fractional color translations can be performed by interpolation. The offsets may be a function of color or vertical position, or both. Further, the functions (or look up table data) used to determine scan positions may utilize multipliers or phase offsets for additional scaling of the resulting image.

At 1040, interpolation is performed between pixels on either side of the horizontal scan position for each color. In some embodiments, (e.g., where the vertical scan position is approximated as a constant row), horizontal interpolation is performed between pixels on the same row. In other embodiments, horizontal interpolation is performed between pixels in more than one row.

At 1050, interpolation is performed between pixels above and below the vertical scan position for each color. This vertical interpolation is performed if fractional pixel vertical alignment is being performed. In some embodiments, 1050 is omitted. For example, when the vertical scan position is approximated as a constant row, vertical interpolation is not performed.

At 1060, the horizontal and vertical interpolations are combined to arrive at a pixel intensity for a pixel to display. The pixel to display has been created using interpolation and scan position determination techniques that also provide for fractional color offsets. At 1070, the pixel is displayed. The pixel may be displayed using any suitable device, such as that shown in FIG. 1.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An image generation apparatus comprising:
   a frame buffer to hold data corresponding to an image made up of display pixels;
   a translation component to receive color image data and color offset data, the translation component operable to spatially translate separate color planes within the color image data as specified by the color offset data and to write translated color image data to the frame buffer;
   a row buffer coupled to the frame buffer to receive at least one row of pixel data from translated color image data; and
   a horizontal scan position determination component to periodically determine a horizontal scan position of a scan trajectory; and
   an interpolation component coupled to receive pixel data from the row buffer and operable to interpolate between display pixels on either side of the horizontal scan position in the at least one row.

2. The image generation apparatus of claim 1 further comprising a vertical scan position determination component operable to approximate a vertical scan position of the scan trajectory as a different row for each horizontal sweep of the scan trajectory.

3. The image generation apparatus of claim 1 wherein the horizontal scan position determination component is operable to determine the horizontal scan position as a sine of an increasing angle plus a horizontal offset that is a function of color.

4. The image generation apparatus of claim 1 wherein the horizontal scan position determination component is operable to determine the horizontal scan position as (a sine of an increasing angle) times a multiplier.

5. A mobile device comprising:
   a laser projector to project an image, the laser projector including an image generation apparatus having a frame buffer to hold data corresponding to an image made up of display pixels, a translation component to receive the color image data and color offset data, the translation component operable to spatially translate separate color planes within the color image data as specified by the color offset data and to write translated color image data to the frame buffer, a row buffer coupled to the frame buffer to receive at least one row of pixel data from translated color image data, a horizontal scan position determination component to periodically determine a horizontal scan position of a scan trajectory, and an interpolation component coupled to receive pixel data from the row buffer and operable to interpolate between display pixels on either side of the horizontal scan position in the at least one row.

6. The mobile device of claim 5 further comprising a communications receiver.

7. The mobile device of claim 5 further comprising a communications transceiver.

8. The mobile device of claim 7 wherein the communications transceiver is operable to communicate using cellular telephone signals.

9. A method performed by an image generation apparatus comprising:
   separately spatially translating each color plane in a color image while writing the color image to a frame buffer within the image generation apparatus;
   retrieving at least one row of pixel data from the color image in the frame buffer;
   determining a horizontal scan position of a scan trajectory;
   horizontally interpolating between pixel data to the left and right of the horizontal scan position to determine a pixel intensity of a new pixel at the horizontal scan position; and
   displaying the new pixel at the horizontal scan position.

10. The method of claim 9 further comprising:
    determining a vertical scan position of the scan trajectory; and
    vertically interpolating between pixel data above and below the vertical scan position; and
    combining the horizontal and vertical interpolation to arrive at the pixel intensity of the new pixel at an intersection of the horizontal scan position and the vertical scan position.

11. The method of claim 9 wherein determining a horizontal scan position comprises adding a horizontal offset to a mathematical function of time.

* * * * *